O. C. L. HIRSCH.
SAUSAGE LINKING AND HANGING MACHINE.
APPLICATION FILED JUNE 23, 1919.

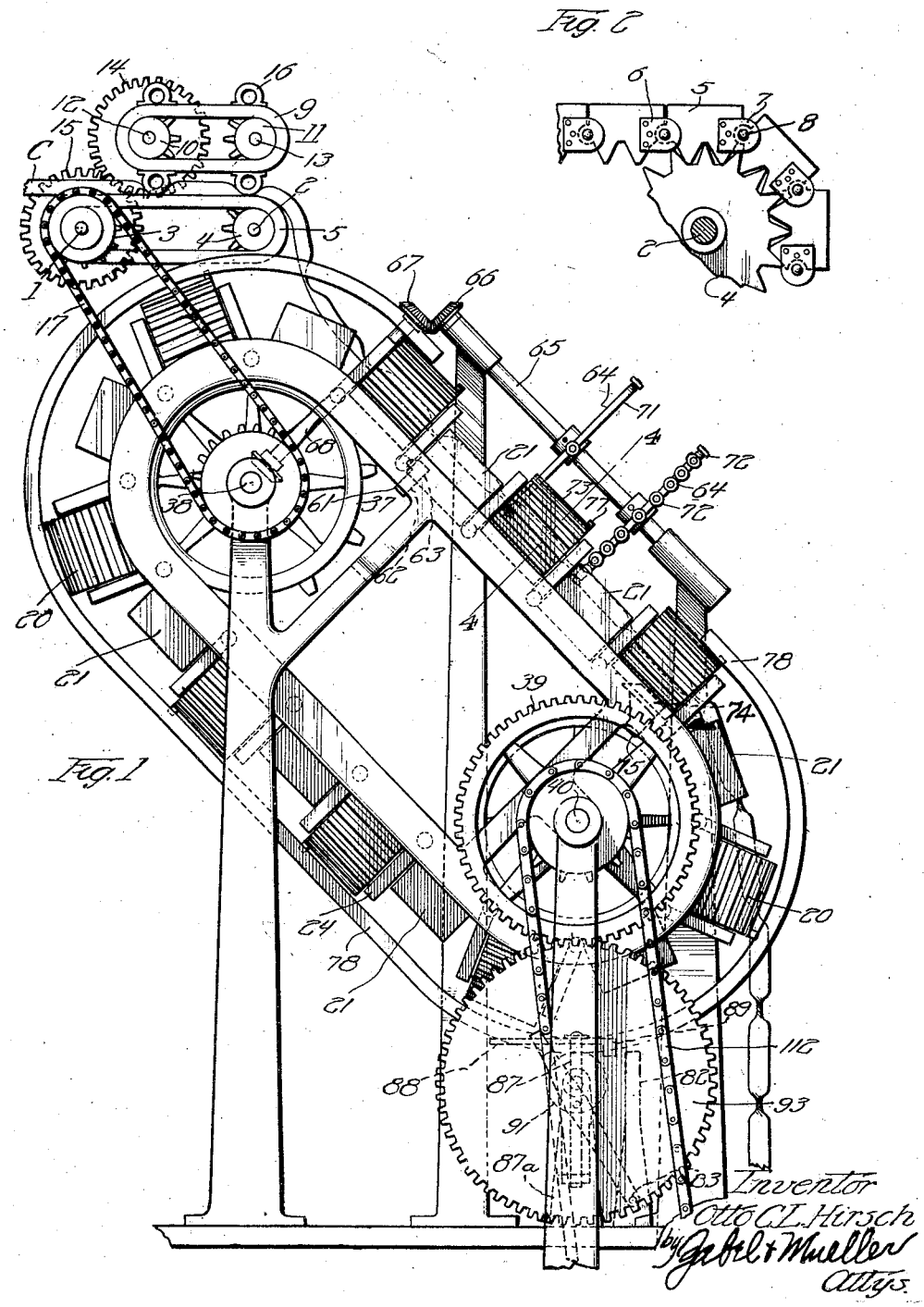

1,431,227.

Patented Oct. 10, 1922.

Inventor
Otto C. L. Hirsch
by Gabel & Mueller
Attys.

O. C. L. HIRSCH.
SAUSAGE LINKING AND HANGING MACHINE.
APPLICATION FILED JUNE 23, 1919.

1,431,227.

Patented Oct. 10, 1922.

Inventor
Otto C.L. Hirsch
by Jabel & Mueller
Attys.

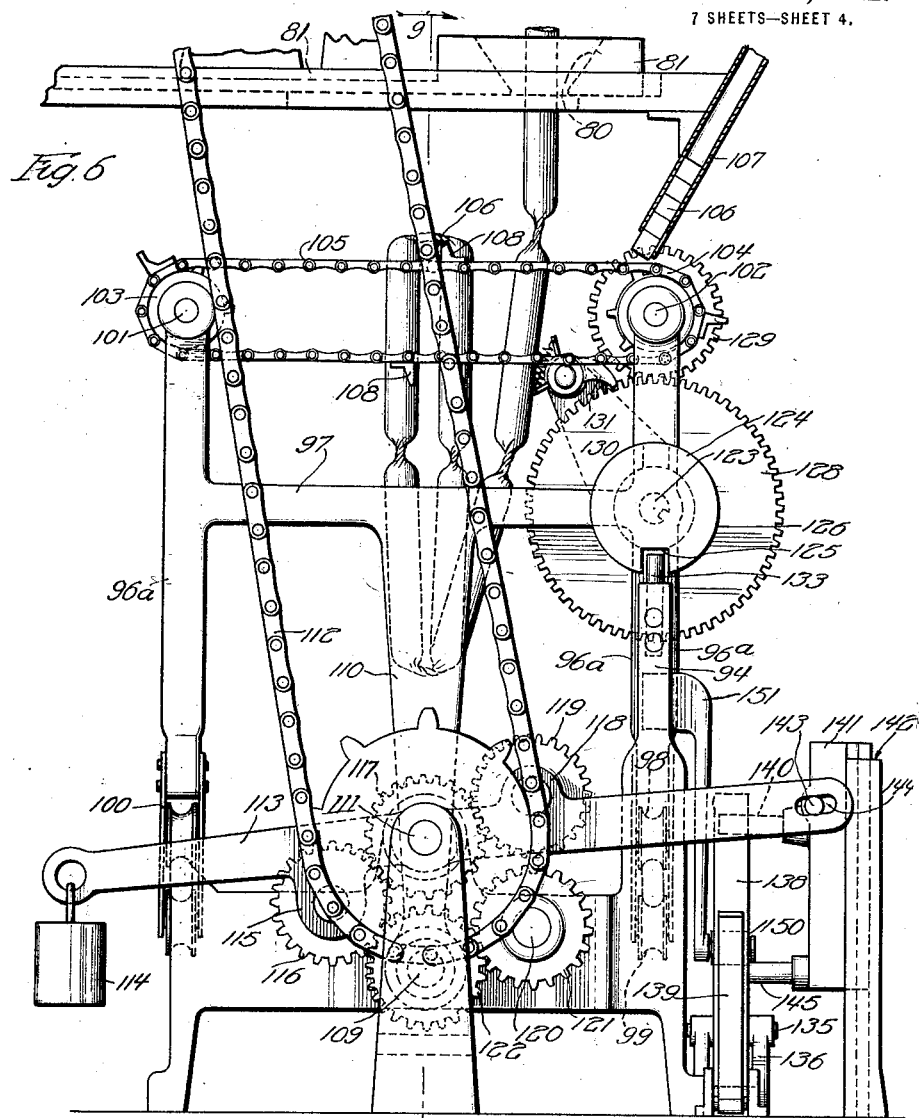

O. C. L. HIRSCH.
SAUSAGE LINKING AND HANGING MACHINE.
APPLICATION FILED JUNE 23, 1919.
1,431,227.
Patented Oct. 10, 1922.
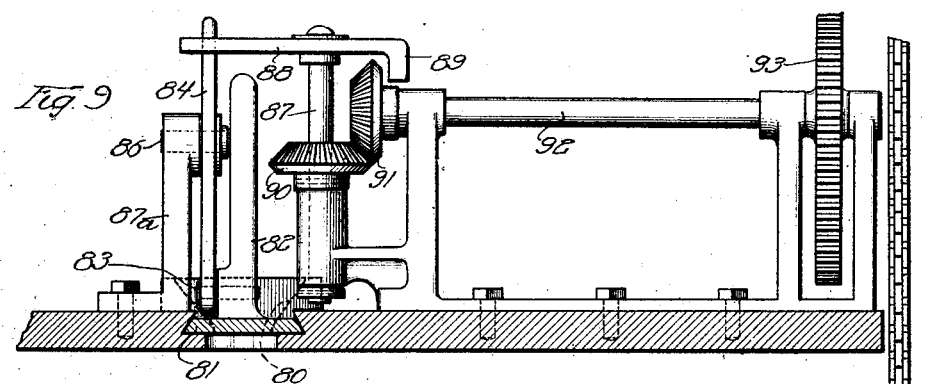
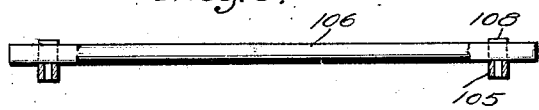
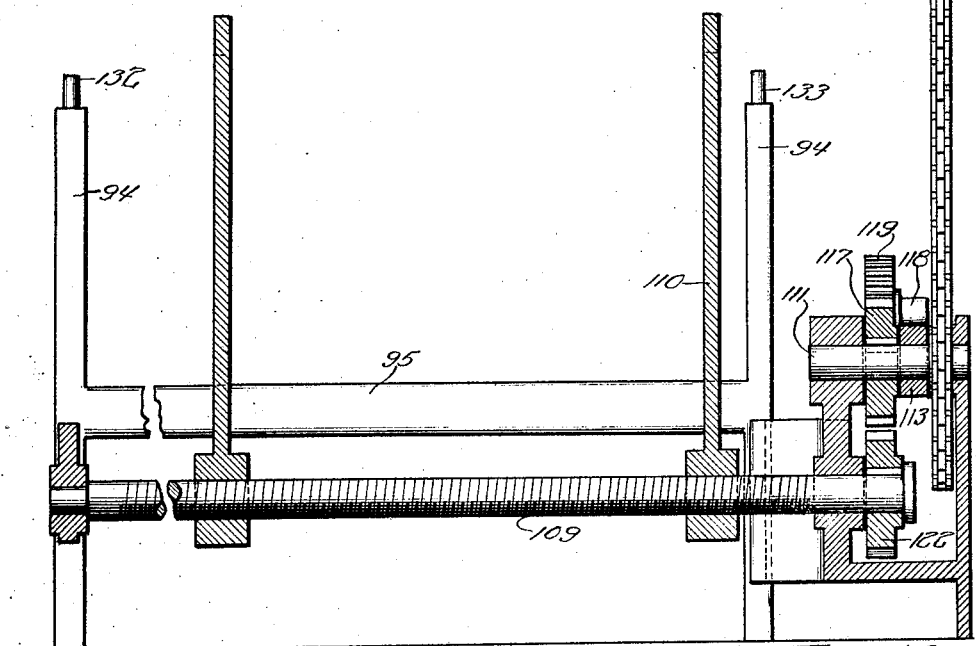
Inventor
Otto C. L. Hirsch
by Gabel & Mueller
Attys

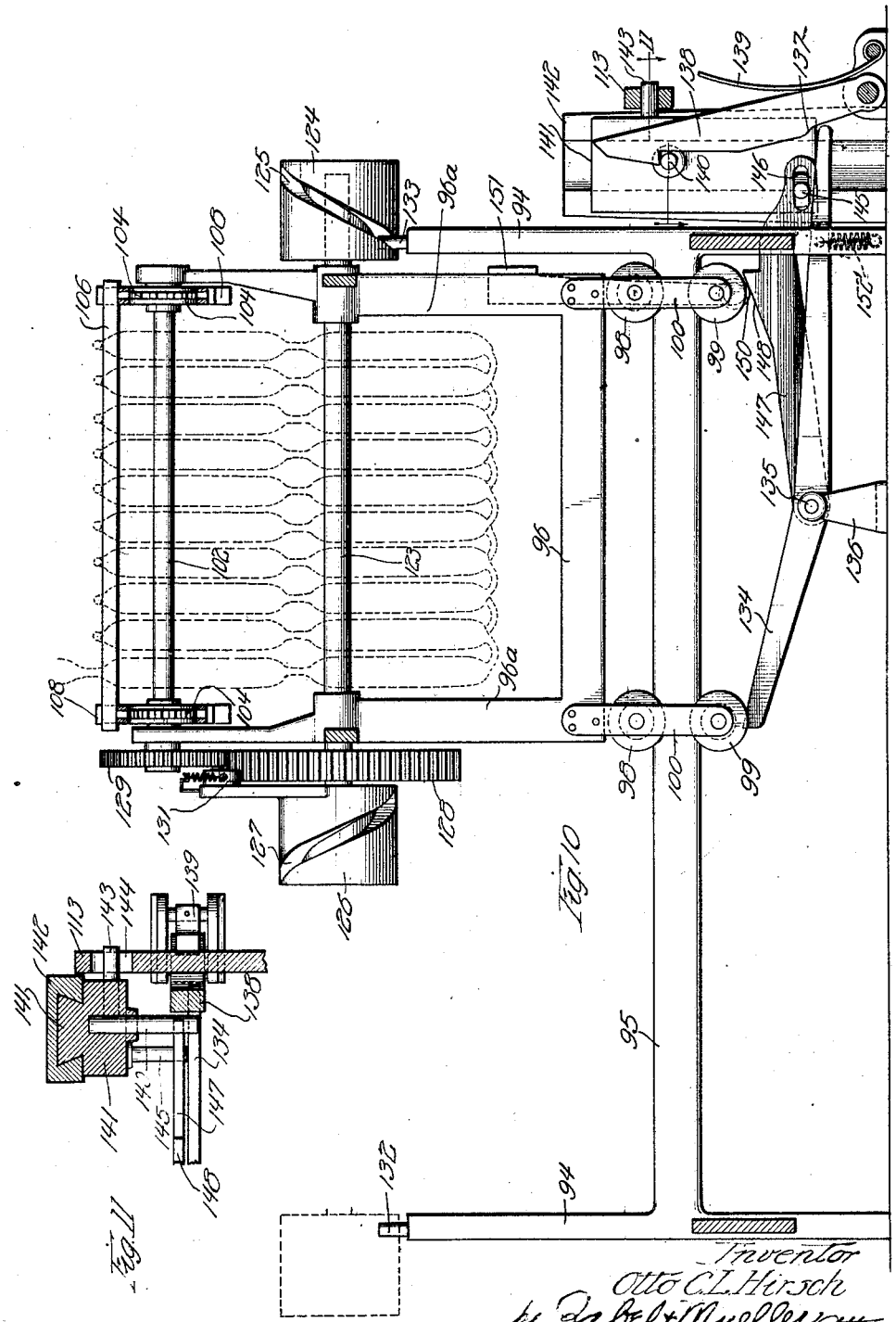

O. C. L. HIRSCH.
SAUSAGE LINKING AND HANGING MACHINE.
APPLICATION FILED JUNE 23, 1919.
1,431,227.
Patented Oct. 10, 1922.
7 SHEETS—SHEET 7.
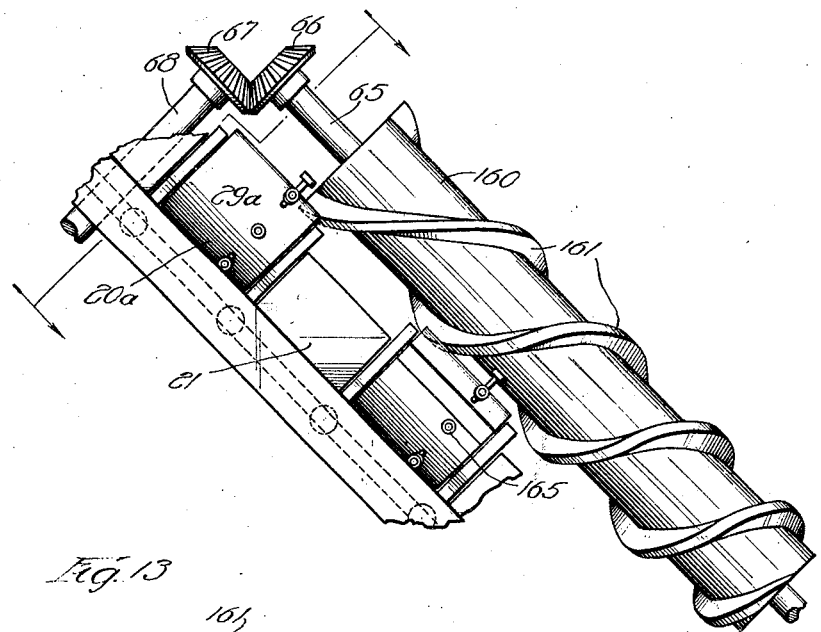
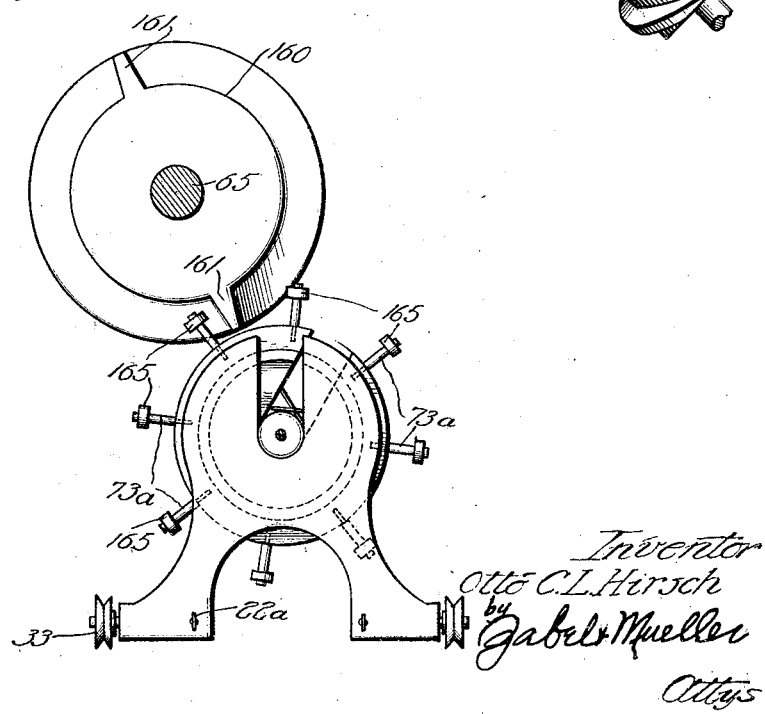
Inventor
Otto C. L. Hirsch
by Gabel & Mueller
Attys Patented Oct. 10, 1922.

1,431,227

UNITED STATES PATENT OFFICE.

OTTO C. L. HIRSCH, OF EVANSTON, ILLINOIS, ASSIGNOR, BY DIRECT AND MESNE ASSIGNMENTS, TO SAUSAGE LINKING MACHINE CORPORATION, OF CHICAGO, ILLINOIS, A CORPORATION OF ILLINOIS.

SAUSAGE LINKING AND HANGING MACHINE.

Application filed June 23, 1919. Serial No. 306,234.

*To all whom it may concern:*

Be it known that I, OTTO C. L. HIRSCH, a citizen of Germany, residing at Evanston, in the county of Cook and State of Illinois, have invented a certain new and useful Improvement in Sausage Linking and Hanging Machines, of which the following is a full, clear, concise, and exact description, reference being had to the accompanying drawings, forming a part of this specification.

My invention relates to sausage linking and hanging machines and more especially to a machine for receiving a filled casing from a filling machine, separating the meat in the casing into desired sections, twisting one section relatively to the adjoining sections and finally hanging the connected sausages across a receiving stick or rod which receiving rod or stick when filled may be replaced by an empty stick.

An object of the invention is to provide, in connection with a linking mechanism, a feeding mechanism for the filled casings which will feed said casing in such a manner as to prevent breaking or tearing of the casings.

Another object is to provide a feeding mechanism for the casings which will, during the feeding operation, separate the meat in the casings into the desired equal lengths without danger of tearing the casings.

Another object is to provide a linking mechanism for receiving the casing with its separated meat sections from the feeding mechanism, twisting one section while the two adjoining sections are held against turning and finally delivering the linked sausages to a hanging mechanism.

Another object is to provide a sausage linking mechanism which is cheap to construct, easy and simple to operate, entirely automatic in its operation and efficient because of the rapidity of its operation. The casings are fed in at one end of the machine and the linked sausages are delivered at the other end and there is no necessity of stopping the machine to insert new casings or remove the sausages.

Another object is to provide a sausage hanging mechanism which will receive the linked sausages, straddle them alternately across and along a receiving stick, remove the stick when full and substitute an empty stick in place of the removed full stick.

Other objects of the invention will be apparent from the following detailed description of the device disclosed in the drawings accompanying this specification. In this specification and in the drawings I have disclosed one form which my invention may take which form is the best known to me at the present time. However it is to be understood that by this specification and the accompanying drawings I do not intend to limit myself to the specific construction disclosed as modifications of the specific structure may be required in the manufacture thereof or may occur to those skilled in this art. The real nature and scope of the invention disclosed is to be determined from the claims appended to this specification.

In the drawings the same reference numerals have been used to designate the same parts, obvious elements of construction being referred to generally and the new elements of my device being specifically designated and described in detail.

Fig. 1 is a side elevation of the feeding and linking mechanism of my device showing the positions of the two devices relatively to each other;

Fig. 2 is a detail view showing, on an enlarged scale, the construction of the block chain which supports the casings as they are led through the feeding mechanism;

Figure 6 is a side view of the hanging mechanism showing in detail, the reversing mechanism for the carriage.

Figure 7 is a detail view partly in section, showing the distributing slide and the mechanism connected therewith for moving it in opposite directions.

Fig. 8 is an elevational detailed view of the sausage receiving stick and the lugs coacting therewith.

Fig. 9 is a section taken approximately on line 9—9 of Fig. 6.

Figure 10 is an end view of the hanging mechanism shown in Figure 6.

Figure 11 is a sectional view taken on line 11—11 of Figure 10.

Figure 12 is a side elevation of a modified form of the twisting element and its driving member.

Figure 13 is an end view of the mechanism shown in Figure 12.

Figure 3:
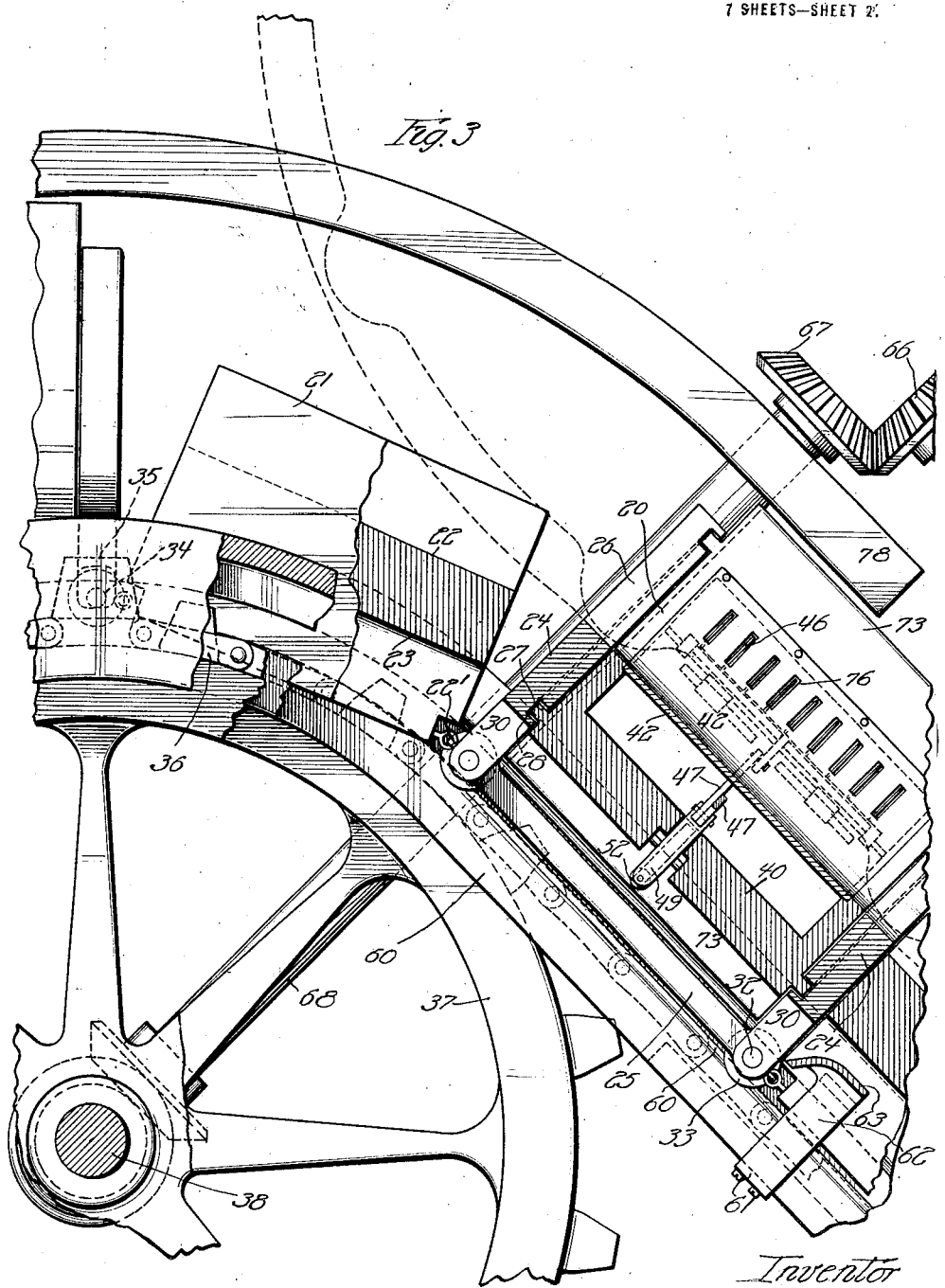
Fig. 3 is a side elevation on enlarged scale and partly in section, of a portion of the linking device shown in Fig. 1.

My device as a whole comprises three separate mechanisms which operate in timed and regular relation, each operating successively on the length of sausage casing which is fed through the device. The three mechanisms will be described in the order of their operation and are constructed substantially as follows:

Feeding mechanism.

The first or so-called feeding mechanism of my device is supported with any suitable standards or supports (not shown) and comprises a drive shaft 1 and a cooperating shaft 2 located horizontally in front thereof. The shaft 1 has secured thereto a sprocket 3 and a similar sprocket is mounted on the shaft 2. Traversing these sprockets in an endless path is a block chain which supports the sausage casing when it is introduced into the machine.

This chain is constructed as shown in Fig. 2 and comprises a series of blocks 5 each provided with two plates 6 rigidly secured thereto at one end and an extension 7 at its other end. Only one plate 6 is shown in Fig. 2 but it is to be understood that a similar plate is used on the opposite side of the block 5. The plates 6 and the extension 7 are provided with alined openings to receive a pivot pin or bolt 8. The plates 6 and extensions 7 are positioned some distance below the surface of the blocks 5 so as to permit ready travel of the blocks around the sprockets 3 and 4 but to prevent sagging of the chain or blocks between the sprockets. Fig. 2 shows that when the blocks are horizontal, the adjoining faces are in firm contact and the chain therefore provides a solid and almost rigid horizontal support for the casings C. The blocks are provided on their sides adjacent the sprockets 3 and 4 with suitably formed projections to engage the teeth of the sprockets. These are clearly shown in Fig. 2.

Cooperating with the above described block chain, is a second chain 9 running in an endless path around sprockets 10 and 11 supported respectively by shafts 12 and 13. The sprocket 10 is keyed to shaft 12 and the shaft 12 has secured thereto a gear 14 which meshes with and receives motion from gear 15 rigidly secured to shaft 1. This upper chain 9 is an ordinary link chain tensioned around the sprockets 10 and 11 but if so desired, it may be constructed of blocks 5 as shown in Fig. 2 for the lower chain.

The upper chain has attached thereto at desired spaced intervals, a series of blocks or pads 16 preferably made of soft rubber. Any suitable means may be used to secure these blocks to the chain. To further increase the yielding or resilient properties of the blocks 16 and to cause them to more effectively separate the meat in the casings without tearing the casings, they are made hollow as shown in Fig. 1. As the casing is fed between the chains, the highest point of the block 16 moving counter-clockwise around the sprocket 10 comes into contact with the casing. As the block and casing advance, the block is forced into the casing and flattens out due to the pressure exerted thereon. This flattening out of the block 16 causes the meat to be separated into sections with empty portions of the casing between them. These empty portions form the closed twisted sections between the sausage links.

The feeding mechanism is driven from the linking mechanism by means of a sprocket chain 17 traversing suitable sprockets on the shafts 1 and 38. The speed of the feeding mechanism is slightly greater than that of the linking mechanism in order that enough slack may be provided in the casing C to allow for the contraction in its length due to the twisting of the casing between the sausage links. This difference in speed is readily obtained by proportioning the sizes of the sprockets engaging the chain 17.

For the sake of clearness the supporting means for the shafts 1, 2, 12 and 13 have not been shown but any suitable means may be provided to support the mechanism in the relative position shown. The shaft 1 is positioned in advance of the shaft 12 so that a portion of the block or lower chain will extend in front of the chain 9. The end of the casing C may be placed on this exposed position of the lower chain and thus readily introduced into the machine.

Linking mechanism.

Positioned in advance of and below the feeding mechanism is the so-called linking mechanism. It is to be understood however that the feeding device described above is also really a part of the linking mechanism inasmuch as the blocks 16 separate the meat into sections which finally constitute the sausage links. The two mechanisms have been termed differently and described separately merely to simplify the description and to set forth the fundamental operation of each. The two devices cooperate in their entireties and each is necessary to the successful operation of the other.

Suitable standards are provided to support the mechanism but as these may be changed to meet the needs of the existing case they are not specifically described, but are referred to only as becomes necessary in the description of the more important elements of the device.

The linking mechanism comprises principally a series of dissimilar carriages 20 and 21 for receiving, conveying and twisting the sausages. These carriages are arranged end to end and are pivotally connected by means of hinge elements 22', shown as comprising an eye bolt on the carriage 21 connected to a loop or staple on carriage 20. Any other means of pivotal connection may of course be used. There are two of these pivoted elements at each end of each carriage, one placed near each side of the carriage.

Figure 4:
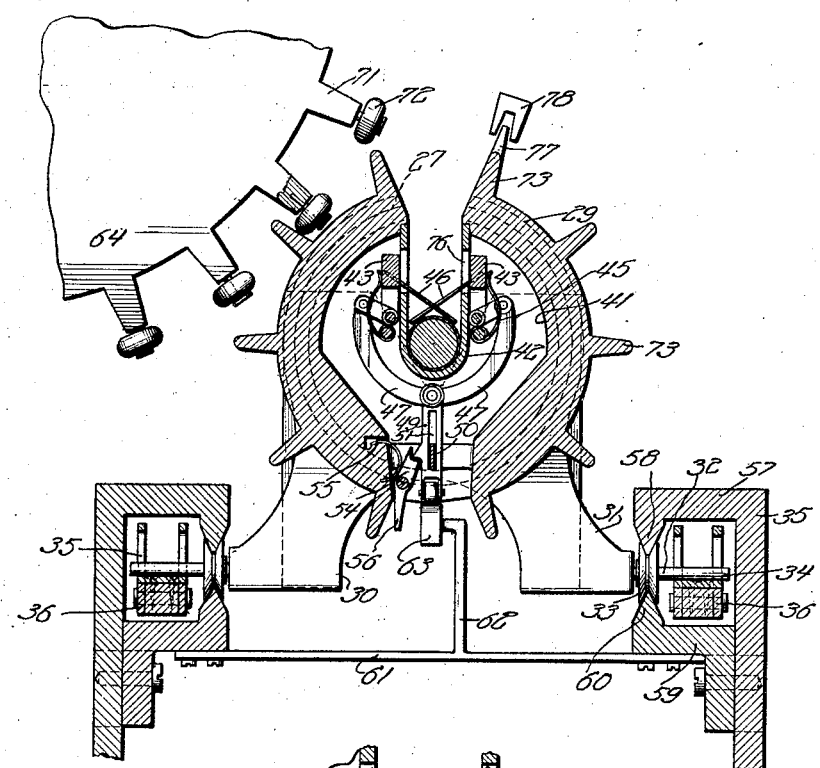
Fig. 4 is a sectional view on approximately line 4, 4 of Fig. 1 showing an end view of the elements within the carriages which operate to twist the respective sausage links.

The construction of the carriage 21 is clearly shown in Figs. 3 and 4, Fig. 3 showing a side view, partly in section and Fig. 4 showing partly in dotted outline, an end view of the carriage. The carriage comprises a block having a V-shaped groove 22 in its upper surface to receive and support a sausage section. A groove 23 is also provided in its lower side to provide space for the passing of certain elements later to be described. The carriages 21 are supported only by means of the pivoted connections 22' and constitute connecting links between the carriages 20.

The carriages 20 are shown in detail in Figs. 3 and 4 and comprise end plates 24 connected rigidly together by means of side bars 25 shown in Fig. 3. The plates 24 are provided with U-shaped openings 26 which permit the sausages to drop into the carriage. These openings are in alinement with the grooves 22 of carriages 21. The plates 24 are also provided with circular grooves 27 into which fit circular ribs 28 formed on each end of a twisting element 29 which will be described later.

The end plates are curved upwardly as shown at 30 to provide clearance for certain elements which will be described later and the sides of these plates are extended outwardly as shown at 31 to provide mountings for the pivotal bearings 32 of guide rollers 33. Each carriage 20 is therefore provided with four supporting and guiding rollers 33 which rollers cause the carriages 20 to travel with a steady motion. The carriages 21 being supported by carriages 20, partake of any movements imparted to the latter carriages.

The pivots 32 at the forward ends of two of the carriages 20 are extended as shown at 34 in Fig. 4 and engage in suitable openings in brackets 35 secured as shown in Fig. 4 to a drive chain 36. More of the carriages may be thus connected to the drive chain if so desired but two has been found sufficient to cause the elements to function properly and smoothly. There are of course, two drive chains 36 as shown in Fig. 4.

The upper ends of the drive chains 36 pass over sprockets 37 secured to the shaft 38. The lower ends of the chains pass over sprockets 39 secured to the shaft 40. The shafts 38 and 40 are supported by suitable standards shown in Fig. 1.

Figure 5:
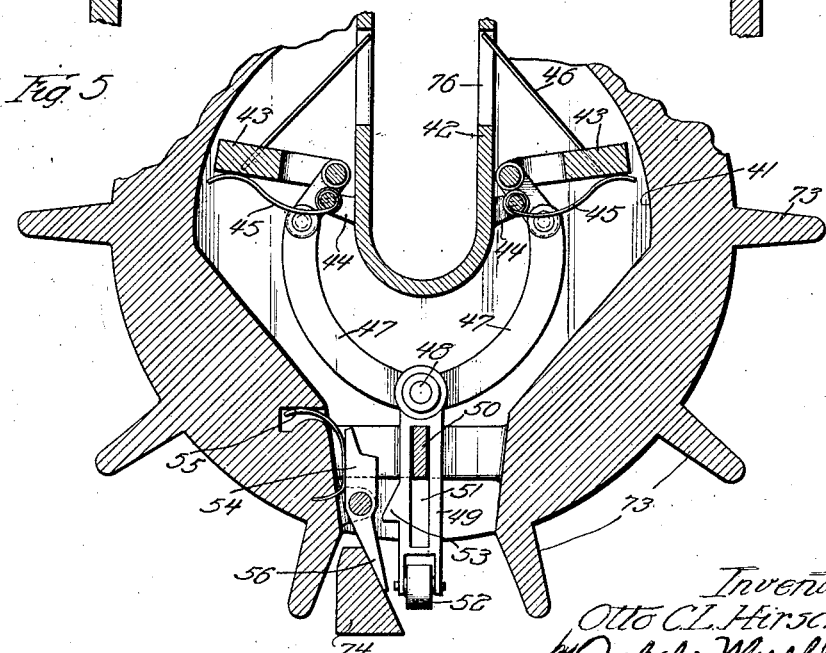
Fig. 5 shows part of the mechanism shown in Fig. 4 at the opposite limit of its movement.

The twisting element 29 referred to above is constructed as shown in detail in Figs. 3, 4, and 5. This element has extending therethrough a U-shaped groove to receive and hold the sausage. The central portion of this element is hollowed out as shown in Figs. 3 and 4 at 41 and this space accommodates mechanism for firmly holding the sausage against rotation in the element. This holding mechanism comprises the following elements. A U-shaped plate 42 extends from end to end of the element 29. Pivoted to the sides of this U-shaped plate 42 are bell crank levers 43 shown clearly in Figs. 4 and 5. These bell cranks are pivoted to suitable brackets 44 extending from the plate 42. Springs 45 tend to hold these bell cranks 43 in the position shown in Fig. 4. The levers 43 have extending therefrom holding elements preferably in the form of bristles 46, which may be made of thin steel wire if so desired. Ordinary stiff bristles of any kind may, however be used. The purpose of these bristles is to hold the sausage firmly at the position of the U-shaped plate 42 so that the sausage will rotate with the element 29. The bristles are yielding and therefore accommodate themselves to any size of casing which may be passed through the machine. The bell crank levers 43 are operatively connected by means of toggle members 47 which members are curved and brought together beneath the U-shaped plate 42. A pivot pin 48 connects the ends of these toggle members 47 and to this pivot is secured a vertically movable member 49 which extends downwardly so that its lower end, when in normal position, is in line with the outer circumference of the element 29. This member 49 is guided in its vertical movement by means of a guide bar 50 which extends into a slot 51 in the member 49 as is clearly shown in Fig. 5. The lower end of the member 49 is provided with a roller 52, the purpose of which will be later explained. On the side of the member 49 is a projecting lug 53 which is adapted to be engaged by a locking dog 54 controlled by the curved leaf spring 53 shown in Figs. 4 and 5. This spring 55 tends to hold the dog 54 in contact with the lug 53. The dog 54 is provided with an extension 56 at its lower end, the purpose of which will be described later.

The carriages 20 are guided in their movements by means of suitable bracket mechanism shown in Fig. 4. This bracket mechanism comprises an overhanging element 57 provided with a downwardly extending V-shaped edge 58 and an underlying element 59 provided with an upwardly extending V-shaped guiding edge 60. The edges 58 and 60 engage in V-shaped grooves in the guiding rollers 33. This bracket mechanism is elliptical in shape and extends around the sprockets 37 and 39 as shown in Fig. 1, and guide the carriages at all stations of their movement. Extending from one bracket mechanism to the other is a cross bar 61 shown clearly in Fig. 4, which cross bar supports an upwardly extending bracket 62. The bracket carries at its upper end a cam 63 adapted to engage the roller 52 at the lower end of the member 49. This cam 63 is shaped as shown in Fig. 3 and as the carriages 20 pass thereover the cam engages roller 52 which is then in the position shown in Fig. 5 and raises the roller together with the member 49 upwardly to the position shown in Fig. 4. This causes the dog 54 to lock the member 49 in its raised position. As the member 49 is raised by the cam as just described, the toggle members 47 act upon the bell crank levers 43 and swing them from the position shown in Fig. 5 to the position shown in Fig. 4. This movement of the bell crank levers 43, toggle members 47 and members 49 occurs shortly after the sausage has entered the U-shaped plate 42. The position of the cam 63 relatively to the shaft 38 and the entrance point of the sausage is clearly shown in Figs. 1 and 3.

After the sausages are thus securely clamped in the twisting element 29 the carriage advances to a position where it will be engaged by a suitable turning member 64 shown in Figs. 1 and 4. There are two or more of these turning members 64 as shown in Fig. 1 so that the sausage will, during its travel through the machine, be subjected to a plurality of twisting movements. These turning members 64 are mounted upon and keyed to a shaft 65 which is located above but to one side of the path of the carriages 20. This shaft 65 is supported as shown in Fig. 1, and has secured to its upper end a beveled pinion 66 which meshes with a second beveled pinion 67 secured to the upper end of a shaft 68. This shaft 68 extends downwardly and has secured to its lower end a beveled pinion 69 which meshes with a further beveled pinion 70 secured to the shaft 38. As the shaft 38 is driven motion is imparted therefrom to the shaft 65 and the turning members 64. These turning members 64 are constructed as shown in detail in Fig. 4 and comprise a series of radially extending arms 71, each having rotatably secured thereto a roller bearing member 72.

The twisting element 29 is provided with a series of radially extending teeth or projections 73 as shown in Fig. 4 which projections are adapted to be engaged by the roller members 72 on the turning member 64. As the carriage 20 advances the projections 73 are brought into the path of movement of the roller members 72 and are engaged and turned thereby until the carriage 20 moves the projections 73 beyond the path of movement of the roller members 72. During this movement a sausage is subjected to a rapid twisting movement. Two of the turning members 64 are shown so that the sausage is subjected to a second similar twisting movement as the carriage advances into the path of the second set of roller members 72. After the carriages 20 have passed the second turning member 64 and the twisting operation is completed, it is necessary to open the bell crank levers 43 to permit the sausage to fall out of the twisting element 29. This opening movement of the bell crank levers 43 is brought about as follows: Positioned above the shaft 40 and beyond the turning member 64 is a second cam member 74 shaped as clearly shown in Fig. 5. This cam member 74 is supported upon a cross bar 75 extending between the two carriage guides. This cam member 74 engages the extension 56 of the dog 54 and moves it to the position shown in Fig. 5, thus allowing the member 49 to be moved downwardly by the springs 45. These springs 45 normally tend to hold the bell crank levers 43 in the position shown in Fig. 5, hence when the dog 54 releases the member 49 the bell crank levers will swing to a position where the bristles 46 will be drawn out of the space between the side walls of the U-shaped plate 42. This will permit the sausages to drop out of the twisting elements 29 as the element moves around the lower side of the sprockets 39. It might be here stated that the bristles 46 do not extend the entire length of the bell crank levers 43 but are formed in bunches or sections as is clear from Fig. 3 of the drawings. These bunches of bristles pass through suitable slots 76 provided in the side walls of the U-shaped plate 42.

In order to prevent turning movement of the twisting element 29 during their passage around the ends and bottom of the guides 57 and 59 the following mechanism is provided. One of the teeth or projections 73 is provided with an extension 77 which is clearly shown in Fig. 4. This extension engages a guide 78 which guide begins at a point directly above the cam 74, extends around the sprockets 39 and 37 and to a point slightly in advance of the cam 63. The long tooth 77 engaging this guide prevents any movement of the twisting element 29 during its travel beyond the turning members 64.

The guide elements 57 and 59 may be supported on arms extending from the standards which support the shafts 38 and 40 as shown in Fig. 1.

In Figs. 12 and 13 I have shown a modification of the device wherein the twisting elements are rotated by means of a rotatable member 160 secured to the shaft 65 and provided with spirally arranged projecting ribs 161. It will be clear from Fig. 12 that the pitch of the ribs 161 decreases toward the lower end of member 65. The result of this construction is that the twisting element is rotated slowly at first and then more rapidly as the carriage advances.

In this modification the carriages 21 are the same as in the first modification but the twisting elements 29ª of the carriages 20ª are somewhat changed. The interior mechanism is the same as that shown in Figs. 4 and 5 but the teeth 73 are replaced by projecting members 73ª having rollers 165 at their ends to engage the spiral ribs 161 of member 160. The twisting elements 29ª are rotated during the entire time they travel past member 160. This time is short as the machine operates rapidly and will twist approximately ten links per second.

*Hanging mechanism.*

After dropping out of the carriages 20 the sausages pass downwardly through a suitable opening 80 in a slidable member 81. This slidable member 81 has a dove tail connection with the base or support of the machine as is clearly shown in Fig. 8 of the drawings. The opening 80 is made funnel shape so that the sausages will be readily guided therethrough. Rigidly secured to this slide 81 is a vertically extending standard 82. Pivoted to this standard at 83 is a lever 84 provided with a slot 85 which engages a pin 86 in a suitable standard 87ª secured to the base of the machine. When the lever 84 is in vertical position its upper end is higher than the upper end of the standard 82 secured to the slide 81. The standard 82 and lever 84 serve to impart sliding movements in either direction to the slide 81 in order to distribute the sausages across a receiving and supporting stick later to be described. In order to effect these movements of the slide 81 the following means are used. A vertically positioned shaft 87 has secured to its upper end an arm 88 which is adapted to engage the upper end of the lever 84. An oppositely extending arm 89 is provided on the shaft 87, this arm having a downwardly extending end which is adapted to engage the standard 82.

Secured to the shaft 87 is a beveled pinion 90 which meshes with a second beveled pinion 91 secured to the end of the shaft 92. This shaft 92 extends horizontally and has secured to its other end a gear 93 which is driven from a suitable gear on the lower shaft 40. As the shaft 92 rotates, the arms 88 and 89 swing around in a horizontal plane and engage alternately the lever 84 and the standard 82. When the lever 84 is in the position shown in Fig. 7 the arm 89 moves around and engages the standard 82 and moves it to the left in Fig. 7. This will cause a movement of the slide 81 toward the left, and as the standard 82 moves with the slide 81 it is carried to a point in vertical alignment with the pin 86. At the same time the lever 84, due to its connection with the slide, will be moved to vertical position. As the arm 88 moves around in regular time it engages the upper end of the lever and moves the slide 81 back to its position shown in Fig. 7. The arm 89 is so short that it does not engage the lever 84.

Positioned beneath the base of the linking mechanism described above, and below the slide 81, is the hanging mechanism proper. This mechanism comprises suitable side frames 94 connected by means of cross bars 95. These cross bars 95 form guiding supports for a carriage mechanism which will now be described. This carriage mechanism 96 comprises suitable side frames 96ª connected by cross members 97. The lower ends of the side frames are provided with rollers 98 and 99 which engage above and below the guides 95. The rollers 98 and 99 are suitably connected and supported by plates 100, shown clearly in Fig. 6. This double support of the side frames of the carriage prevents displacement of the carriage. At the top of the side frames 96ª are shafts 101 and 102 provided with suitable sprockets 103 and 104 around which travel suitable supporting chains 105 which receive and hold the supporting sticks 106, across which the sausages are distributed by the slide 81. The sticks 106 are contained in a suitable hopper 107 and are removed therefrom by lugs 108 rigidly secured to the chain 105. As the chain moves forwardly the lugs 108 engage the lowermost stick in the hopper and move it therefrom and carry it to a position beneath the slide 81. As the slide moves back and forth it distributes the sausages across the stick 106 as is shown in Fig. 6. The movements of the slide 81 are preferably so timed that four sausages will be lowered on one side of the stick 106 and four on the opposite side. This number, of course, may be varied and will necessarily vary according to the length and size of the sausages acted upon.

In order to prevent piling up of the sausages at one part of the stick, the following mechanism is used. The carriage 96 is moved transversely of the path of movement of the slide 81 by means of a spirally threaded rotatable shaft 109 which engages a downwardly extending threaded member 110 secured to the carriage. This shaft 109 is rotated alternately in opposite directions by means of the reversing mechanism shown in Fig. 6. This reversing mechanism comprises a stub shaft 111 driven by means of a sprocket chain 112 connected to a suitable sprocket on the lower shaft 40. As the shaft 40 is constantly running the shaft 111 will likewise be constantly rotated. Pivoted on this shaft 111 is a lever 113 carrying at one end a weight 114 which tends to normally maintain lever in position shown in Fig. 6. This lever has a downwardly extending lug 115 which supports a gear 116 constantly in mesh with a gear 117 secured to the shaft 111. The lever 113 is provided with a further upwardly extending lug 118 which supports a gear 119 constantly in mesh with the said gear 117. Secured to an end plate of the support for the carriage mechanism is a stub shaft 120 forming the pivot of an idle gear 121 which gear is normally in mesh with a gear 122 secured to the shaft 109 as shown in Fig. 6. The gears 116, 117 and 122 are in mesh and this train of gearing will cause rotation of the spirally threaded shaft 109 in one direction. When the lever 113 is moved in a direction to raise the weight 114 by mechanism later to be described; the gear 119 will be moved into mesh with the gear 121 and the gear 116 will be moved out of mesh with the gear 122. This train of gearing 117, 119, 121, and 122 will cause rotation of the shaft 109 in the opposite direction. These different rotations of the shaft 109 will cause the carriage 96 to move in opposite directions, that is, from its position shown in Fig. 10 toward the left along the guides 95 and back again.

The carriage 96 is provided with suitable bearings in which rotates a shaft 123 having secured thereto at one end a cam block 124 provided with a cam slot 125, and at its other end a cam block 126 provided with a cam slot 127. Shaft 123 loosely supports a large gear 128, meshing with a smaller gear 129 secured to one end of the shaft 102 previously referred to. Secured to the shaft 123 adjacent gear 128 is an arm 130 having at its outer end a spring controlled pawl 131, which engages the teeth of the gear 128. When the arm 130 moves clockwise in Fig. 6, the pawl engages the teeth on gear 128 and the gear moves with the arm. When the arm returns, the pawl 131 rides idly over the gear teeth.

One end 94 of the supporting frame is provided with a pin 132, adapted to engage the cam slot 127 and the other end of the frame is provided with a pin 133 adapted to engage the cam slot 125. As the carriage 96 moves to the left in Fig. 10 and approaches the limit of its movement, the cam slot 127 engages pin 132 and as the carriage completes its movement to the left, the pin 132 and slot 127 cooperate to rotate shaft 123 and arm 130. This results in rotation of gears 128 and 129, shaft 102 and sprockets 104, and consequent movement, to the left in Fig. 6, of chains 105 and the filled stick 106 carried thereby. At the same time succeeding lugs 108 on the chains remove a new stick from the hopper 107 and position it beneath the slide 81.

As the carriage 96 approaches the limit of its movement to the left in Fig. 10, a roller 150 at the right end of the carriage 96 engages the upwardly turned end of a lever 134, pivoted at 135 to a suitable standard 136. This causes the other end of lever 134 to engage a cam face 137 on a hook-shaped member 138, moving it to the right against the action of spring 139. The member 138 engages a pin 140 on a slide 141, movable vertically in a guideway 142. The slide has extending from one side thereof a pin 143, which engages in an oblong slot 144 in one end of lever 113. The weight 114 tends to move the slide 141 vertically and will cause such movement of the slide as soon as member 138 releases pin 140. The slide 141 has a third pin 145, extending in the same direction as pin 141. This third pin engages in an oblong slot 146 in one end of a lever 147, pivoted at 135. The lever has a cam surface 148 adapted to be engaged by the roller 150 previously referred to as the carriage 96 approaches the limit of its movement to the right in Fig. 10. This causes a depression of lever 147 and a consequent downward movement of slide 141 and the attached end of lever 113 against the action of weight 114. This same movement of lever 113 causes a shifting of the gears and a change in direction of rotation of shaft 109, thereby causing carriage 96 to begin its travel in the opposite direction.

As the carriage approaches its limiting position at the right in Fig. 10, pin 133 engages cam slot 125 and causes rotation of shaft 123, arm 130, gears 128 and 129, and sprockets 104 thereby causing the filled stick 106 to be carried away as previously described.

The roller 150 is conveniently supported by a downwardly extending arm 151, attached to carriage 96 as shown in Figs. 6 and 10. A spring 152 is provided to keep right end of lever 134 normally below cam 137.

The distance between the center lines of plates 24 will be equal to the length of the respective links of sausages. If sausages of different lengths are to be made, the carriage 20 and 21 may be replaced by other similar carriages of the desired length. The inclination of the guides 57 and 59 may be varied as desired; in fact the device will operate successfully if the guides are placed horizontally. The diameter of the twisting elements 29 will remain the same in carriages 20 of different lengths. The space between the walls of the U-shaped plate 42 will be equal to the diameter of the largest casing to be made in the machine. The bristles 46 accommodate themselves to casings of all diameters within the range of the machine and as they enter the space between the walls of plate 42 near the top they will serve to force the casing to the bottom of the space, should its diameter cause it to stick before reaching the bottom.

The construction and operation of my machine will be apparent from the detailed description given above and a further statement of the operation of the device is believed unnecessary. The description, together with the drawings, will enable others skilled in the art to make and use the invention.

Having thus fully disclosed my invention, what I claim as new is:—

1. A sausage linking machine, comprising in combination, a linking mechanism and a feeding mechanism adapted to feed a casing to the linking mechanism in a slack condition.

2. A sausage linking mechanism comprising a twisting mechanism, and means for feeding a casing to the twisting mechanism in a slack condition in order to prevent tearing of the casing during the twisting operation.

3. A sausage linking mechanism comprising a twisting mechanism and means to separate the meat in a casing into sections and feeding said sections to the twisting mechanism in a slack condition so as to prevent tearing of the casing during the twisting operation.

4. A sausage linking mechanism comprising a feeding mechanism and a twisting mechanism, said feeding mechanism running at a speed greater than the speed of travel of the twisting mechanism.

5. A feeding mechanism for a sausage linking and hanging machine comprising cooperating endless conveyors, one of said conveyors having a series of yieldable meat separating blocks secured thereto, said blocks being made of cushioning material and having a central opening to increase the yieldability thereof.

6. A sausage linking machine comprising a twisting mechanism having a series of carriages provided with twisting mechanism connected end to end to form an endless conveyor said conveyor being provided with guiding means for the carriages so that the path of movement of said conveyors has straight portions and curved portions connecting the straight portions.

7. A feeding mechanism for a sausage linking and hanging machine comprising a supporting conveyor, a cooperating conveyor provided with a series of spaced resilient meat-separating blocks secured thereto, and means for causing said conveyors to operate in timed relation.

8. A sausage linking and hanging machine comprising a forwardly travelling twisting mechanism, a feeding mechanism associated therewith and means to impart a plurality of twisting movements to said twisting mechanism.

9. A sausage linking and hanging machine comprising a twisting mechanism having a series of carriages linked end to end to form an endless conveyor for the sausages, said conveyor having straight runs.

10. A sausage linking and hanging machine comprising a twisting mechanism having a series of alternate dissimilar carriages pivotally connected end to end to form an endless conveyor for the sausages.

11. A sausage linking and hanging machine comprising a series of alternate dissimilar carriages connected end to end to form an endless conveyor for the sausages, certain of the alternate carriages having a rotatable twisting element adapted to twist a section of the sausage supported thereby.

12. A sausage linking and hanging machine comprising a series of alternate dissimilar carriages connected end to end to form an endless conveyor for the sausages, certain of the alternate carriages having grooves in their upper surface to provide a support for the sausages.

13. A sausage linking and hanging machine comprising a series of alternate dissimilar carriages connected end to end to form an endless conveyor for the sausages, certain of the alternate carriages having grooves in their upper surface to provide a support for the sausages between the other carriages.

14. A sausage linking machine comprising a series of alternated supporting and twisting carriages linked together to form an endless chain conveyor, said conveyor being mounted so as to have straight portions and curved portions.

15. A sausage linking and hanging machine comprising a connected series of alternate supporting and twisting carriages having guide rollers and guides in which said rollers are adapted to travel.

16. A sausage linking and hanging machine comprising a series of alternate supporting and twisting carriages, guide rollers secured to said twisting carriages, guides in which said rollers are adapted to travel, and means for connecting the supporting carriages to the twisting carriages.

17. A sausage linking and hanging machine comprising a series of alternate supporting and twisting carriages, said supporting carriages being supported only by said twisting carriages.

18. A sausage linking and hanging machine comprising a series of alternate supporting and twisting carriages connected end to end and guiding means for only the twisting carriages.

19. A sausage linking and hanging machine comprising a twisting carriage having mounted thereon a twisting element provided with means to receive and hold a sausage and means for turning said twisting element on the carriage.

20. A sausage linking and hanging machine comprising a twisting carriage having mounted thereon a twisting element, a U-shaped plate secured to said element for receiving a sausage and means to clamp the sausage in said plate.

21. A sausage linking and hanging machine comprising a twisting carriage having mounted thereon a twisting element, a U-shaped plate secured to said element for receiving a sausage, means to clamp the sausage in said plate and means to rotate said element on said carriage.

22. A sausage linking and hanging machine comprising a carriage having mounted thereon a twisting element, a U-shaped plate secured to said element for receiving the sausage, bell-crank levers pivoted in said element, bristles projecting from said levers through openings in said plate and adapted when said levers are in one position to clamp the sausage in said plate.

23. A sausage linking and hanging machine comprising a carriage having mounted thereon a twisting element, a U-shaped plate secured to said element for receiving the sausage, bell-crank levers pivoted in said element, bristles projecting from said levers through openings in said plate and adapted when said levers are in one position to clamp the sausage in said plate and means to rotate said element on said carriage.

24. A sausage linking and hanging mechanism, comprising endless guides, a series of alternate dissimilar carriages traveling on said guides, twisting elements mounted upon certain of said carriages and means located above the path of travel of said carriages to rotate said twisting elements.

25. A sausage linking and hanging mechanism comprising endless guides, a series of carriages traveling on said guides, twisting elements mounted upon certain of said carriages, means for moving said carriages along said guides, and means located adjacent to path of travel of said carriages to rotate said twisting elements.

26. A sausage linking and hanging mechanism having a twisting carriage comprising end plates rigidly secured together, means on said end plates for supporting a twisting element, a twisting element, means on said elements for clamping a sausage therein, and means to rotate said element.

27. A sausage linking and hanging mechanism having in combination a twisting carriage comprising end plates rigidly secured together, circular grooves in said end plates, a twisting element, circular ribs on the ends of said elements adapted to engage said grooves, and means for rotating said element.

28. A sausage linking and hanging mechanism having in combination a twisting carriage comprising end plates rigidly secured together, means on said plates for supporting a twisting element, a twisting element, means in said element for supporting and clamping a sausage therein and means for rotating said element on said carriage.

29. A sausage linking and hanging mechanism having a twisting carriage comprising end plates rigidly secured together, a twisting element, means for supporting said element on said plates, a U-shaped plate in said element for supporting a sausage, bell-crank levers provided with bristles adapted to clamp the sausage in said plate, toggle members connecting said members, and a slidable member pivotally connected to said toggle members.

30. A sausage linking and hanging mechanism having a twisting carriage comprising end plates rigidly secured together, a twisting element, means for supporting said element on said plates, a U-shaped plate in said element for supporting a sausage, slots in said plate, bell-crank levers provided with bristles adapted to pass through said slots and clamp the sausage in said plate, a slidable member operatively connected to said levers, and means for moving said slidable member to cause said bristles to clamp the sausage in said plate.

31. A sausage linking and hanging mechanism comprising a twisting carriage having end plates rigidly secured together, a twisting element mounted on said plates, a U-shaped plate in said element for supporting a sausage, bell-crank levers provided with bristles adapted to clamp the sausage in said plate, a slidable member operatively connected to said levers, means for moving said slidable member to cause said bristles to clamp the sausage in said plate, and means to hold said bell-crank levers in their clamping position.

32. A sausage linking and hanging machine having in combination a feeding mechanism, a twisting mechanism, a slide provided with a funnel-shaped opening adapted to receive the linked sausages from the twisting mechanism, a receiving stick for the sausages and means to periodically move said slide to cause sausages to hang on alternate sides of the receiving stick.

33. A sausage linking and hanging machine having in combination a feeding mechanism, a twisting mechanism, a slide provided with a funnel-shaped opening adapted to receive the linked sausages from the twisting mechanism, a receiving stick for the sausages, means to periodically move said slide to cause sausages to hang on alternate sides of the receiving stick, and means to move said stick longitudinally in a direction at right angles to the direction of travel of the slide.

34. A sausage linking and hanging machine having in combination a feeding mechanism, a twisting mechanism, a slide provided with an opening adapted to receive the linked sausage from the twisting mechanism, a receiving stick for the sausages, means to periodically move said slide to cause sausages to hang on alternate sides of the receiving stick, means to move said stick longitudinally in a direction at right angles to the direction of travel of the slide, and means to move said stick laterally away from said opening when said stick has reached the limit of its motion in either direction.

35. A sausage linking and hanging machine having in combination a feeding mechanism, a twisting mechanism, a slide provided with an opening adapted to receive the linked sausages from the twisting mechanism, a receiving stick for the sausages, means to periodically move said slide to cause sausages to hang on alternate sides of the receiving stick, means to move said stick longitudinally in a direction at right angles to the direction of travel of the slide, and means to move said stick laterally away from said opening when said stick has reached the limit of its motion in either direction and position an empty stick beneath said opening.

36. A sausage linking and hanging machine having in combination a feeding mechanism, a twisting mechanism, and a hanging mechanism comprising a laterally bodily movable carriage, means on said carriage to support a receiving stick for the sausages below the twisting mechanism, and means to move said carriage laterally of said twisting mechanism.

37. A sausage linking and hanging machine having in combination a feeding mechanism, a twisting mechanism, and a hanging mechanism comprising a laterally movable carriage, and means to move said carriage in either direction.

38. A sausage linking and hanging machine having in combination a feeding mechanism, a twisting mechanism, and a hanging mechanism comprising a laterally movable carriage, means to move said carriage in either direction and reversing mechanism for changing the direction of travel of said carriage.

39. A sausage linking and hanging machine having in combination a feeding mechanism, a twisting mechanism, and a hanging mechanism comprising a laterally movably receiving carriage, means on said carriage to support a receiving stick below said twisting mechanism, means to move said carriage laterally of said twisting mechanism, and means to move said supporting means to carry the stick away from the twisting mechanism when the carriage reaches the limit of its motion in either direction.

40. A sausage linking and hanging machine having in combination a feeding mechanism, a twisting mechanism, and a hanging mechanism comprising a laterally movable receiving carriage, a hopper for receiving sticks, chains on said carriage provided with lugs adapted to remove a stick from said hopper and position it beneath said twisting mechanism, means to move said carriage laterally of said twisting mechanism, and means to move said chains to carry the stick away from the twisting mechanism when the carriage reaches the limit of its motion in either direction.

41. A sausage linking and hanging machine having in combination a feeding mechanism, a twisting mechanism, and a hanging mechanism comprising a laterally movable receiving carriage, guides for said carriage, a spirally threaded shaft for moving said carriage in either direction along said guides, a reversing mechanism for controlling the direction of rotation of said shaft, and means on said carriage for causing said reversing mechanism to change the direction of rotation of said shaft when the carriage reaches the limit of its motion in either direction.

42. A sausage linking and hanging machine having in combination a feeding mechanism, a twisting mechanism, and a hanging mechanism comprising a laterally movable receiving carriage, mechanism for causing said carriage to move in either direction, and means on said carriage for causing a change in direction of rotation of said last named mechanism when the carriage reaches the limit of its motion in either direction.

43. A receiving carriage for a sausage linking and hanging machine comprising means for receiving and holding a sausage receiving stick, means for guiding said carriage, means for moving said carriage along said guiding means, reversing mechanism for said moving means, and means on said carriage for causing the reversing mechanism to change the direction of rotation of said moving means.

44. A receiving carriage for a sausage linking and hanging machine, comprising means for receiving and holding a sausage receiving stick, guides for said carriage means for moving the carriage along said guides, and means for moving said stick and its supporting means when the carriage reaches the limit of this movement in either direction.

45. A receiving carriage for a sausage linking and hanging machine comprising movable chain members for receiving and supporting a sausage receiving stick, guides for said carriage, means for moving the carriage in either direction along said guides, and means for moving said chain members and stick on said carriage when the carriage reaches the limit of its motion in either direction.

46. A sausage linking machine comprising a series of alternated supporting and twisting carriages linked together to form an endless chain conveyor, said conveyor being mounted so as to have straight portions and curved portions, and means for imparting a rotary movement to said twisting carriages when said carriages are moving along the straight portions of said conveyor.

47. A sausage linking and hanging machine comprising a twisting carriage having a twisting element mounted thereon, a channel-shaped plate secured to said element for receiving a sausage and means for holding the sausage in said channel.

48. A sausage linking and hanging machine comprising a carriage having a twisting element mounted thereon, a channel-shaped plate secured to said element for receiving the sausage, bell crank levers pivoted in said element, members projecting from said levers through openings in said plate and adapted when said levers are in one position to clamp the sausage in the channel of said plate.

In witness whereof, I hereunto subscribe my name this 9th day of June, A. D. 1919.

OTTO C. L. HIRSCH.